(12) United States Patent
Shi et al.

(10) Patent No.: US 8,995,283 B2
(45) Date of Patent: Mar. 31, 2015

(54) MANAGING BEHAVIOR OF RELEASE-7 AND RELEASE-8 USER EQUIPMENT DURING CONTINUOUS PACKET CONNECTIVITY CONFIGURATION

(75) Inventors: Nianshan Shi, Järfälla (SE); Johan Hultell, Solna (SE); Seungtai Kim, Solna (SE); Paulson Angelo Vijay Silveris, Bangalore/Karnataka (IN)

(73) Assignee: Telefonaktieboalget L M Ericsson (publ), Stockholm (SE)

( * ) Notice: Subject to any disclaimer, the term of this patent is extended or adjusted under 35 U.S.C. 154(b) by 136 days.

(21) Appl. No.: 13/578,776

(22) PCT Filed: Jun. 25, 2012

(86) PCT No.: PCT/SE2012/050706

§ 371 (c)(1),
(2), (4) Date: Aug. 13, 2012

(87) PCT Pub. No.: WO2013/048304

PCT Pub. Date: Apr. 4, 2013

(65) Prior Publication Data

US 2013/0077498 A1    Mar. 28, 2013

Related U.S. Application Data

(60) Provisional application No. 61/539,137, filed on Sep. 26, 2011.

(51) Int. Cl.
*H04L 12/50*     (2006.01)
*H04Q 11/00*     (2006.01)
(Continued)

(52) U.S. Cl.
CPC ............. *H04W 24/02* (2013.01); *H04W 76/04* (2013.01); *H04W 76/048* (2013.01); *H04W 92/12* (2013.01)
USPC ..................................................... 370/242

(58) Field of Classification Search
CPC . H04W 76/048; H04W 76/027; H04W 56/00; H04W 28/0289; H04L 47/127

USPC ......................................... 370/242, 225, 331
See application file for complete search history.

(56) References Cited

U.S. PATENT DOCUMENTS 8,072,963 B2 * 12/2011 Suzuki .......................... 370/350
(Continued)

FOREIGN PATENT DOCUMENTS

EP          2031929 A2 *  3/2009
WO   WO 2009143774 A1 * 12/2009

OTHER PUBLICATIONS

3rd Generation Partnership Project. "Add HS-DSCH DRX Operation Support Indicator into Cell Update/URA Update." 3GPP TSG-RAN WG2 Meeting #64, R2-087157, Prague,Czech Republic, Nov. 10-14, 2008.

(Continued)

*Primary Examiner* — Andrew Chriss
*Assistant Examiner* — Voster Preval
(74) *Attorney, Agent, or Firm* — Muprhy, Bilak & Homiller, PLLC (57) ABSTRACT

When a serving Node B has deactivated Continuous Packet Connectivity and the UE then is reconfigured with a RRC reconfiguration message, it can happen that the UE acts as though CPC is activated whereas the serving Node B, on the other hand, acts as though CPC functionality is still deactivated. In several embodiments of techniques for addressing this problem, previously known signaling messages and/or user plane frame headers are modified to include new indicators/parameters, which are used to signal that a given UE should be expected to have non-uniform behavior with respect to remembering CPC activation status after acting on a RRC Reconfiguration message, because it is a Release 7 or Release 8 mobile station. These new indicators/parameters may also be used by a Node B, in some embodiments, to acknowledge the receipt of an indication from an RNC that non-uniform behavior should be anticipated for a given UE.

21 Claims, 8 Drawing Sheets

(51) Int. Cl.
*H04W 24/02* (2009.01)
*H04W 76/04* (2009.01)
*H04W 92/12* (2009.01)

(56) References Cited

U.S. PATENT DOCUMENTS

| | | | |
|---|---|---|---|
| 2008/0130488 A1* | 6/2008 | Kuo | 370/216 |
| 2009/0316613 A1* | 12/2009 | Tseng | 370/310 |
| 2010/0165835 A1* | 7/2010 | Hsu et al. | 370/225 |
| 2010/0165935 A1* | 7/2010 | Cho et al. | 370/329 |
| 2011/0026462 A1* | 2/2011 | Montojo et al. | 370/328 |
| 2011/0081928 A1* | 4/2011 | Chen et al. | 455/507 |

OTHER PUBLICATIONS

3rd Generation Partnership Project."Extend UE Support Indicator Extension for DTXDRX." 3GPP TSG-RAN3 Meeting #73, R3-111900, Athens, Greece, Aug. 22-26, 2011.

3rd Generation Partnership Project. "DTX/DRX Related HS-SCCH Order." 3GPP TSG-RAN WG3 Meeting #73bis, R3-112572, Zhuhai,China, Oct. 10-14, 2011.

3GPP, "3rd Generation Partnership Project; Technical Specification Group Radio Access Network; Physical layer procedures (FDD) (Release 11)", 3GPP TS 25.214 V11.0.0, Dec. 2011, 1-106.

3GPP, "3rd Generation Partnership Project; Technical Specification Group Radio Access Network; UTRAN Iub interface Node B Application Part (NBAP) signalling (Release 11)", 3GPP TS 25.433 V11.0.0, Dec. 2011, 1-1285.

3GPP, "3rd Generation Partnership Project; Technical Specification Group Radio Access Network; UTRAN Iub/Iur interface user plane protocol for DCH data streams (Release 10)", 3GPP TS 25.427 V10.1.0, Jun. 2011, 1-48.

3GPP, "3rd Generation Partnership Project; Technical Specification Group Radio Access Network; UTRAN Iur interface Radio Network Subsystem Application Part (RNSAP) signalling (Release 11)", 3GPP TS 25.423 V11.0.0, Dec. 2011, 1-1145.

3GPP, "3rd Generation Partnership Project; Technical Specification Group Radio Access Network; UTRAN Iur interface user plane protocols for Common Transport Channel data streams (Release 10)", 3GPP TS 25.425 V10.2.0, Dec. 2011, 1-49.

3GPP, "3rd Generation Partnership Project; Technical Specification Group Radio Access Network; UTRAN Iub interface user plane protocols for Common Transport Channel data streams (Release 10)", 3GPP TS 25.435 V10.2.0, Jun. 2011, 1-61.

* cited by examiner

| | |
|---|---|
| 7 | 0 |

| Spare bits 7-6 | Congestion Status | CmCH-PI |
|---|---|---|
| Spare bits 7-3 | | Maximum MAC-d/c PDU Length |
| Maximum MAC-d/c PDU Length (cont) | | |
| HS-DSCH Credits | | |
| HS-DSCH Credits (cont) | | |
| HS-DSCH Interval | | |
| HS-DSCH Repetition Period | | |
| Spare Extension | | |

MANAGING BEHAVIOR OF RELEASE-7 AND RELEASE-8 USER EQUIPMENT DURING CONTINUOUS PACKET CONNECTIVITY CONFIGURATION

TECHNICAL FIELD

The present invention generally relates to wireless communications networks, and more particularly relates to signaling techniques for ensuring that mobile stations and base stations are operating under the same assumptions with respect to the status of Continuous Packet Connectivity activation.

BACKGROUND

Continuous Packet Connectivity (CPC), introduced in Release 7 of the $3^{rd}$-Generation Partnership Project (3GPP) specifications for the Universal Mobile Telecommunications System (UMTS), aims to improve the user experience by increasing battery lifetime. CPC also serves to increase network capacity, by reducing interference.

CPC is actually a collection of several features. First, CPC includes support for discontinuous transmission in the uplink (UL-DTX). This features enables the mobile station (user equipment, or UE, in 3GPP terminology) to transmit discontinuously on the uplink control channel (Uplink Dedicated Physical Control Channel, or U-DPCCH) during periods of inactivity, i.e., when the UE has no data to send. This saves battery power, since the UE can turn off transmitter circuitry, and also reduces interference, allowing for system capacity improvements. Second, CPC includes support for discontinuous reception of downlink transmissions (DL-DRX), which enables the UE to monitor the downlink control channel (High-Speed Shared Control Channel, or HS-SCCH) intermittently and thus also reduces batter power consumption in the UE. Third, CPC adds a new slot format in the uplink control channel (U-DPCCH), to improve power control of the downlink.

CPC operation is supported by a feature called "HS-SCCH Orders," which provides a fast, layer 1 (L1) signaling mechanism for activating or deactivating uplink discontinuous transmission (UL-DTX) and/or downlink discontinuous reception (DL-DRX). These activation or deactivation orders are sent by a serving base station to the mobile terminal by sending layer 1 (L1) signaling commands to the UE on the High-Speed Shared Control Channel (HS-SCCH), without any involvement of the radio network controller (RNC).

Radio Resource Control (RRC) signaling is used to configure the behavior of the UE with respect to UL-DTX and DL-DRX. More particularly, RRC configuration sets several timing parameters that are applied by the UE to determine how often and when the UE should transmit on the uplink control channel and how often and when the UE should monitor the HS-SCCH.

CPC was first introduced in Release 7 of the 3GPP specifications and has been in use ever since. However, it has recently been recognized that the behavior of UEs designed to the Release 7 and Release 8 versions of the 3GPP specifications is not completely defined with respect to reconfiguration of UL-DTX and DL-DRX. More particularly, if a UE is already configured with DTX/DRX and receives a RRC reconfiguration message in which the value of the information element (IE) "DTX-DRX timing information" is not set to "Continue," and if the serving High-Speed Downlink Shared Channel (HS-DSCH) cell was not changed as a result of this message, the UE's behavior with respect to "remembering" its CPC activation status is not clearly defined. The original intention behind the CPC specifications was that the UE remember the CPC activation status. Thus, if CPC was activated prior to the reconfiguration, CPC would continue to be activated subsequently to the RRC reconfiguration. Likewise, if CPC was not activated prior to the reconfiguration, it would remain that way afterwards. However, depending on a particular UE's implementation, it may or may not be designed to instruct the physical layer to consider that the DTX/DRX-related HS-SCCH orders received before the reconfiguration were never received. In other words, some Release 7 and Release 8 UEs may forget the CPC activation status as a consequence of the RRC reconfiguration described above. This will result in a mismatch between the serving base station (a "Node B," in 3GPP terminology) and the UE regarding the CPC activation status. One example of a RRC configuration for which this mismatch would occur is during soft handover and softer handover when new DTX-DRX timing information is given to the UE via the RRC active set update message.

If the base station and the UE are mismatched with respect to CPC activation status, downlink messages to the UE can be missed, which will increase retransmissions and degrade user performance. Accordingly, techniques for avoiding or resolving these mismatches are needed.

SUMMARY

As noted above, in situations where the serving Node B has deactivated CPC and the UE then is reconfigured with a RRC reconfiguration message where the value of the IE "DTX-DRX timing information" is not "Continue" and the serving HS-DSCH cell was not changed as a result of this message, it can happen that the UE acts as though CPC is activated whereas the serving Node B, on the other hand, acts as though CPC functionality is still deactivated.

Because it assumes that CPC is deactivated, the Node B then bases its scheduling decisions on the assumption that the UE is monitoring the downlink continuously. However, if the UE (after the RRC reconfiguration message) acts as though it was configured with CPC, then it will only listen to the downlink in certain TTIs. If the Node B transmits downlink packets in transmission time intervals (TTIs) during which a UE in DRX state is not listening, the number of Radio Link Control (RLC) retransmissions will increase, and system and user performance will suffer. One example of a RRC configuration for which this mismatch could occur is during soft handover and softer handover, when new DTX-DRX timing information is given to the UE via the RRC active set update message.

This problem can be solved with very minor impacts to the standard, using techniques implemented in an RNC or a Node B, or both. In several embodiments of these techniques, previously known signaling messages and/or user plane frame headers are modified to include new indicators/parameters, which are used to signal that a given UE should be expected to have non-uniform behavior with respect to remembering CPC activation status after acting on a RRC Reconfiguration message, because it is a Release 7 or Release 8 mobile station. These new indicators/parameters may also be used by a Node B, in some embodiments, to acknowledge the receipt of an indication from an RNC that non-uniform behavior should be anticipated for a given UE.

One example method, described in detail below, includes a determination of whether there is a potential CPC activation status mismatch between a user equipment, UE, and its serving base station, i.e., whether the UE can be expected to exhibit non-uniform behavior with respect to continuation of CPC. If so, then a CPC recovery procedure is needed for the UE, and at least one CPC Recovery indicator is sent to the serving Node B, in a frame header of at least one user plane frame for the UE. In some embodiments, the RNC sends a pre-determined number of instances of the CPC Recovery indicator. In others, the RNC repeatedly sends the CPC Recovery indicator until it receives an acknowledgement indicator from the Node B indicating that it has received the CPC Recovery indicator and/or has initiated a CPC recovery process.

In some embodiments, the method summarized above takes place in the context of a soft handover procedure. For example, this method may be carried out upon completing a soft handover procedure for a UE. In some instances, the CPC Recovery indicator is sent in a HS-DSCH CAPACITY REQUEST control frame, e.g., using a previously spare bit. In some embodiments, an acknowledgement response is received from the Node B via a CAPACITY ALLOCATION control frame.

Other example methods include complementary methods implemented by a base station/Node B. One such method comprises receiving a CPC Recovery Indicator, corresponding to a UE served by the base station, in a frame header of at least one user plane frame sent to the base station by an RNC. In response to the CPC Recovery Indicator, a CPC recovery mechanism is initiated. This procedure may comprise, for example, transmitting an HS-SCCH order for activating or deactivating CPC to the UE. In some embodiments, the base station sends a pre-determined number of instances of the order, while in others the base station repeatedly sends the order until it receives an indicator from the UE indicating that it has received the order. In some embodiments, the base station sends an acknowledgement of the CPC Recovery indicator to the RNC it was received from. The base station can then ignore subsequent CPC recovery indicators from the RNC, e.g., until a pre-determined time has expired, or until after one or more frames that do not include the CPC recovery indicator are received from the RNC.

Still other example methods include other methods implemented by a base station/Node B. One such method comprises determining the CPC activation status for a UE. In some embodiments, this is done by computing the HS-SCCH reception pattern for DRX that corresponds to the UE, and observing whether the UE acknowledges transmissions on HS-SCCH that correspond to the pattern.

Base stations and RNCs adapted to carry out any of the techniques summarized above, and variants thereof, are also disclosed in the detailed discussion that follows. Of course, the present invention is not limited to the above-summarized features and advantages. Indeed, those skilled in the art will recognize additional features and advantages upon reading the following detailed description, and upon viewing the accompanying drawings.

DETAILED DESCRIPTION

As noted above, in situations where the serving Node B has deactivated CPC and the UE then is reconfigured with a RRC reconfiguration message where the value of the IE "DTX-DRX timing information" is not "Continue" and the serving HS-DSCH cell was not changed as a result of this message, it can happen that the UE acts as though CPC is activated whereas the serving Node B, on the other hand, acts as though CPC functionality is still deactivated.

Because it assumes that CPC is deactivated, the Node B then bases its scheduling decisions on the assumption that the UE is monitoring the downlink continuously. However, if the UE (after the RRC reconfiguration message) acts as though it was configured with CPC, then it will only listen to the downlink in certain TTIs. If the Node B transmits downlink packets in transmission time intervals (TTIs) during which a UE in DRX state is not listening, the number of Radio Link Control (RLC) retransmissions will increase, and system and user performance will suffer. One example of a RRC configuration for which this mismatch could occur is during soft handover and softer handover, when new DTX-DRX timing information is given to the UE via the RRC active set update message.

Signaling between a Serving Radio Network Controller (SRNC) and the Node B is sent over the Iub interface, while signaling between the SRNC and a Drifting Radio Network Subsystem (DRNS) takes place over the Iur interface. In the currently defined signaling, there is nothing to indicate that this type of CPC reconfiguration has occurred. As a result, the Node B is unaware of any potential CPC activation mismatch situation. However, this problem is limited to Release 7 and Release 8 UEs only, since UE behavior in response to RRC reconfigurations is well defined beginning with Release 9 of the 3GPP specifications.

The following discussion includes a description of several possible solutions to this problem. A first approach can be described as a mixture of control plane and user plane signaling. Two closely related additional approaches are based on the use of control frames in the user plane; both of these approaches uses the HS-DSCH CAPACITY REQUEST control frame, while one adds the use of the CAPACITY ALLOCATION control frame. Finally, a fourth approach relies on the serving Node B to determine for itself whether a potential mismatch as to CPC activation status has occurred. All four of these solutions are described in further detail below.

Solution 1: Mixture of Control Plane and User Plane Solution

According to this first approach, a control plane indicator is introduced, in the Iub and Iur interfaces, to solve the CPC activation status mismatch between UE and Node B. The serving RNC (SRNC) can use this indicator to inform the Node B or a Drift Radio Network Subsystems (DRNS) that the UE has a non-uniform behavior towards remembering the CPC activation status after acting on the RRC Reconfiguration message. In this context "non-uniform behavior towards remembering the CPC activation status" simply means that the UE's behavior with respect to remembering the CPC activation status after a RRC reconfiguration is not well defined, which in turn means that there is a potential mismatch between the Node B and the UE with respect to CPC activation status.

Within the current signaling protocol defined by 3GPP's Node B Application Part (NBAP) and Radio Network Subsystem Application Part (RNSAP) specifications it is possible to introduce this indicator without major change, such as by using some of the existing spare bits. Though this approach solves the problem in a majority of traffic scenarios, it does not address the scenario where the UE is in soft handover and a new radio link is added. This is because the SRNC does not communicate with the serving Node B during the soft handover via the control plane. The control plane indicator over Iub and Iur described above is thus insufficient to address all scenarios.

To address this soft handover scenario, one solution is to use user plane in-band signaling, whereby the SRNC can communicate with the serving Node B. In particular, the HS-DSCH frame headers have spare bits that can be used to signal the Node B that the UE has a non-uniform behavior towards remembering the CPC activation status after acting on the RRC Reconfiguration message.

When a serving Node B is informed that a UE is non-uniform, it can solve the potential mismatch by transmitting a target cell HS-SCCH order for activating or deactivating CPC. Hereinafter, the actions of the Node B in response to learning of a potential mismatch with respect to CPC activation status will be referred to as the "CPC recovery procedure" or "CPC Recovery." One problem that should be noted here is that if the UE is acting as though CPC is activated, then it will only monitor the HS-SCCH channel in certain TTIs. The specific TTIs that are monitored will depend on the Connection Frame Number (CFN) and the configured DRX cycle, as specified in 3GPP TS 25.214, "Physical Layer Procedures," v. 11.0.0 (December 2012; available at www.3gpp.org). To ensure that the UE receives the HS-SCCH order, the Node B can transmit the HS-SCCH order in multiple TTIs, e.g., several consecutive TTIs, until it receives the HARQ-ACK corresponding to the order. Alternatively, the Node B can wait until the next available TTI during which the UE would listen to the downlink if it was configured with CPC, before transmitting the HS-SCCH order.

This first approach to resolving a potential mismatch in CPC activation status is now described in greater detail. When radio links for multi-carrier High-Speed Packet Access (HSPA) are set up (e.g., the secondary radio links) or radio links are added, or when radio links are reconfigured and CPC are used, the SRNC will indicate in one or more Node B Application Part (NBAP) messages and/or Radio Network Subsystem Application Part (RNSAP) messages whether or not the UE has uniform behavior towards DTX/DRX-related HS-SCCH orders. A UE can be considered to be non-uniform when the release version of the UE is Release 7 or Release 8 and if the IE "DTX_DRX timing information" in RRC reconfiguration message is not set to "Continue" while there is no change of serving cell. A serving Node B connected to the SRNC or in a DRNS will use this information to send HS-SCCH orders to activate or de-activate CPC to solve the mismatch situation.

During soft handover, when radio links are added in a new Node B, while serving cells are unchanged, and when CPC is configured for the UE and for the Node Bs belonging to the active set, the SRNC will use the User Plane Frame Protocol (UP Protocol; see 3GPP TS 25.435, v. 10.2.0, and 3GPP TS 25.427, v. 10.1.0, available at www.3gpp.org) to indicate to the serving Node B whether the UE has uniform behavior with respect to DTX/DRX related HS-SCCH orders. The serving Node B will use this information to decide whether it needs to send an HS-SCCH orders to resolve potential ambiguity with respect to the CPC activation status between the UE and the Node B.

Existing spare bits in the user plane frames can be used by the RNC to indicate to the Node B that it should initiate CPC activation status mismatch handling, i.e., CPC recovery. However, including the indicator in all the Iub frames will not be ideal, as the Node B may trigger a transmission of an HS-SCCH order for each frame that is received. On the other hand, including the indicator in one only frame is not suitable either, as there can be frame loss in the transport network. Accordingly, a better approach is to send a short burst of user plane frames that include the indicator.

One problem with repeating the CPC recovery indication in multiple user plane frames is that it is not trivial to decide how many times the CPC recovery indication should be repeated. One approach to address this CPC recovery indicator repetition problem is to have the Node B send an indication to the RNC that the CPC recovery mechanism has been initiated, or that the CPC recovery indication has been received. This can be viewed as an acknowledgement of the CPC recovery indication from the Node B to the RNC.

There are several existing messages sent from Node B/DRNS to inform SRNC about the updates where an extra parameter may be added for this purpose. The RL Parameter Update message in the Iub and Iur interface specifications can be used for this purpose, for example.

Figure 1:
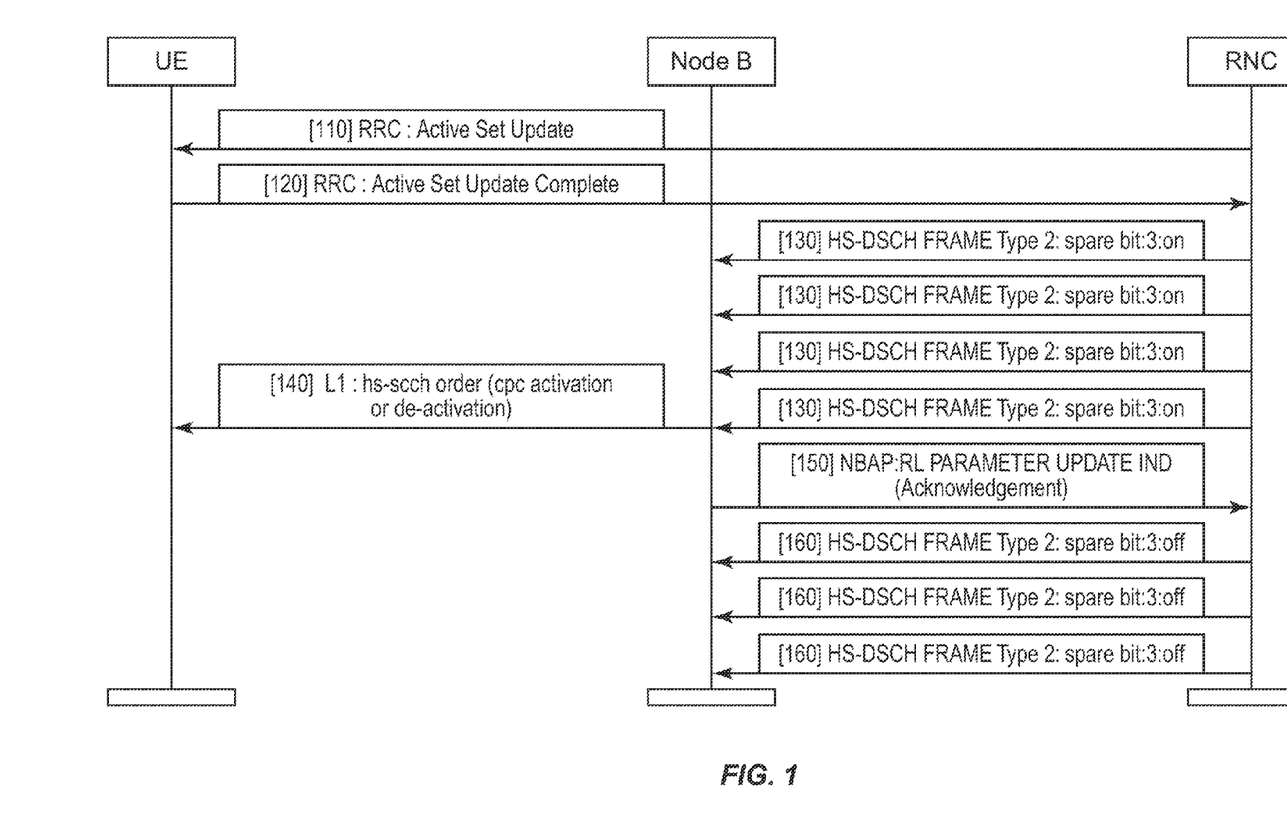
FIG. 1 is a signal flow diagram illustrating a message flow according to some embodiments of the present invention.

Following is an example procedure that represents one such "short burst" solution, which operates over the Iub Interface. FIG. 1 illustrates this procedure. When operated over the Iur interface, Node B will send NBAP RL Parameter update to DRNC, and then DRNC will send RNSAP RL Parameter update to SRNC (step 5).

1. The RNC sends the RRC Active set update message to UE to complete the soft handover procedure. This is shown as message 110 in FIG. 1.
2. The UE sends the RRC Active Set Update (RRC ASU) complete message in response. (Message 120 in FIG. 1.)
3. The RNC, based on the following information, decides whether to include a 'CPC Recovery' indicator in subsequent Iub frames to be sent to Node B:
    a. CPC is configured in the active set
    b. UE's release version is 7 or 8.
    c. New DTX-DRX timing information is given to UE in the RRC Active Set Update message.
    The RNC continues to include a 'CPC Recovery' indicator in the Iub user plane frames until the Node B sends the NBAP RL Parameter update indication with an indication that it has initiated the CPC recovery mechanism. In FIG. 1, the CPC Recovery indicators are sent using a spare bit in HS-DSCH frames. (Messages 130 in FIG. 1.)
4. If Node B has been receiving frames without "CPC recovery" but is now receiving frames with "CPC recovery", then the Node B initiates the CPC recovery procedure. The Node B sends the UE of interest an HS-SCCH order to activate or de-activate the CPC (CPC Recovery) in UE, based on the last known CPC activation status. (Message 140 in FIG. 1.)
5. Node B sends the NBAP RL Parameter update indication to RNC to indicate that CPC recovery mechanism is initiated. (Message 150 in FIG. 1.)
6. RNC, upon receiving the NBAP RL Parameter update indication, stops including the 'CPC recovery' indicator in subsequent Iub frames. (Messages 160 in FIG. 1.)

It should be appreciated that the step 3 detailed above can also be executed before step 2, i.e., the RNC can start sending the Iub frames with 'CPC recovery' indicator before the RRC ASU message is received from UE.

In some cases, the Node B will continue to receive a few frames including the 'CPC recovery' indicator after it sends the NBAP RL Parameter update indication message to RNC. This is because the RNC sends a short burst of IUB frames with "CPC recovery" indicator "ON" and the Node B acts on the first frame received. In one approach to dealing with these extra indications, the Node B is configured to ignore the 'CPC recovery' indicator in the received frames for a predetermined period of time "T" after it has initiated the CPC recovery procedure. This time T may be set by a standard in some cases, or may be implementation-specific in others. It is also possible for this period T to be configured by RRC signaling. In these systems, if the Node B continues to receive frames with 'CPC recovery' indicator "ON" after the period "T" has expired, then the Node B can initiate the CPC recovery procedure again. Another way to overcome this multiple frame issue is by a simple mechanism where the Node B can initiate the CPC recovery procedure by following the pattern of "OFF-ON-OFF" for the "CPC recovery" indicator in the received IUB frames. In other words, if Node B first receives a series of frames with "CPC recovery", but then begins to receive frames without "CPC recovery", Node B should then initiate the CPC recovery procedure.

In a variant of the approach described above, instead of using an NBAP and RNSAP indicator in the non-soft handover case and using the user plane frame protocol in the soft handover case, the user plane frame protocol can be used by the SRNC in both situations to indicate to the serving Node B whether the UE is expected to exhibit uniform behavior with respect to DTX/DRX related HS-SCCH orders.

Also, instead of using NBAP and RNSAP messages for the serving Node B to acknowledge RNC, the Iub frame protocol can be used. For example, the spare bit in a Iub CAPACITY ALLOCATION control frame can be used.

Example modifications to several existing protocols to support the techniques described above are suggested below. In particular, modifications to Radio Network Subsystem Application Part (RNSAP) protocol messages, Node B Application Part (NBAP) protocol messages, and User Plane Frame Protocol headers are described. These proposals are only examples—similar changes to these and other messages may be used.

First, chapter 9.2.2.103 of 3GPP TS 25.423, v. 11.0.0 (available at www.3gpp.org) defines the UE Support Indicator Extension information element in the RNSAP signaling protocol, which is used to indicate to the DRNS the support level in a UE for optional HSDPA functions. According to its current definition, this information element (IE) includes several spare bits. Bit 4, for example, could be used to indicate whether the UE's behavior is uniform or not with respect to the DTX-DRX HS-SCCH orders.

Second, chapter 9.2.2.117 of 3GPP TS 25.433, v. 11.0.0 (available at www.3gpp.org) defines the UE Support Indicator Extension information element in the NBAP signaling protocol, which is used to indicate the support level in the UE for optional HSDPA functions to the Node B. Once again, spare bit 4, for example, could be used to indicate whether the UE's behavior is uniform or not with respect to the DTX-DRX HS-SCCH orders.

Figure 2:
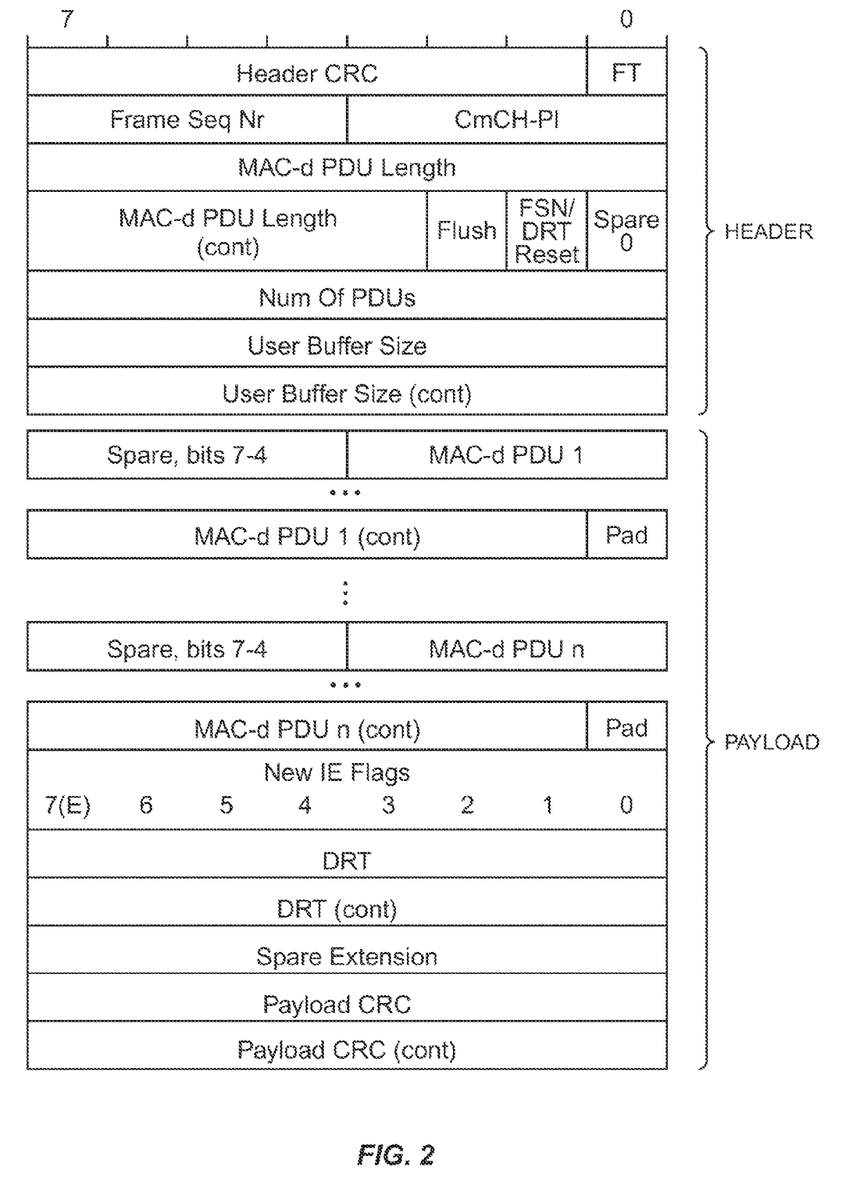
FIG. 2 illustrates a frame structure that may be used in some embodiments of the present invention.

Chapter 6.2.6A of 3GPP TS 25.435, v. 10.4.0 ("UP Protocol", available at www.3gpp.org) defines the HS-DSCH user plane frames sent over the Iub interface. FIG. 2 illustrates the structure of the HS-DSCH Frame type 1. In this frame, the spare 0 bit in the header can be used to indicate to the Serving Node B whether the UE's behavior is uniform or not with respect to the DTX-DRX HS-SCCH orders. Note that there is a corresponding structure in the user plane protocols for the UTRAN Iur interface, which can be found in 3GPP TS 25.425, v. 10.2.0.

Figure 3:
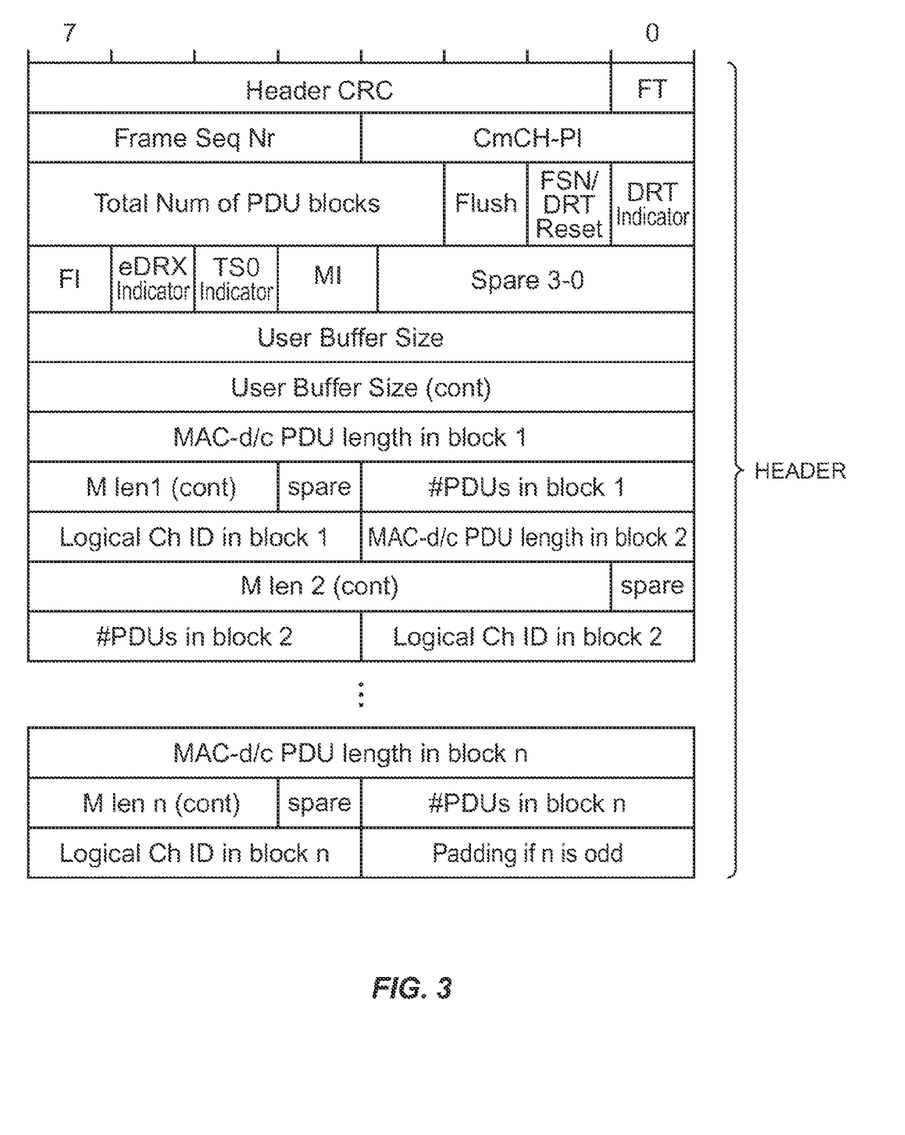
FIGS. 3, 4, 5, and 6 illustrate other frame structures that may be used in one or more embodiments of the present invention.

Similarly, in HS-DSCH Frame type 2, the spare 3 bit in the header can be used to indicate to the Serving Node B whether the UE's behavior is uniform or not with respect to the DTX-DRX HS-SCCH orders. The Frame type 2 header is illustrated in FIG. 3.

Chapter 9.1.58.1 of 3GPP TS 25.423 defines the RADIO LINK PARAMETER UPDATE INDICATION in the RNSAP signaling protocol. An extra parameter can be added to this message to indicate CPC-related HS-SCCH (de)Activation. Similarly, chapter 9.1.89.1 of 3GPP TS 25.433 defines the RADIO LINK PARAMETER UPDATE INDICATION for the NBAP signaling protocol. Again, an extra parameter can be added to indicate CPC related HS-SCCH (de-) activation.

Solution 2: Using CAPACITY REQUEST Control Frame

Another approach to addressing the CPC mismatch problem is to use spare bits in the HS-DSCH CAPACITY REQUEST control frame to alert the Node B of the possibility of a CPC mismatch. These are spare bits that can be used by RNC to instruct the Serving Node B to initiate the CPC recovery procedure.

Figure 4:
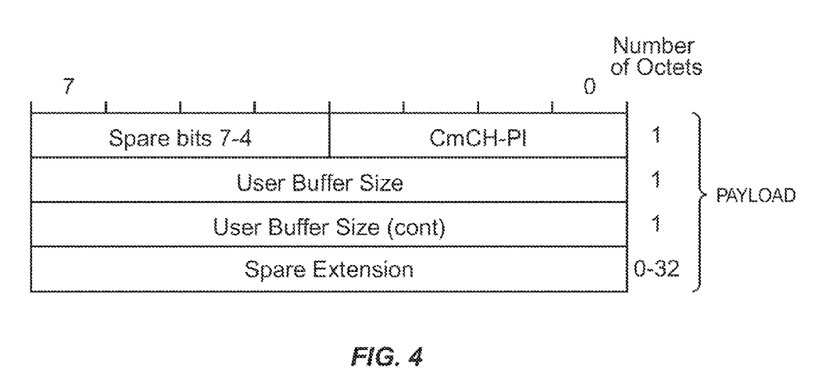

FIG. 4 illustrates the Iub HS-DSCH CAPACITY REQUEST control frame, which is defined in chapter 6.3.3.10 of 3GPP TS 25.435 (UP Protocol). One of the spare bits, e.g., bit 4, can be used by the RNC to indicate to a Node B that there is a potential CPC mismatch situation.

When the serving Node B receives the CAPACITY REQUEST Iub control frame with 'CPC recovery' indicator (e.g., spare bit 4) 'ON', it is thereby informed that this is not a flow control message from RNC and it will not send the Capacity Allocation frame back to RNC. Instead, it will initiate the CPC recovery mechanism.

Solution 3: Using CAPACITY REQUEST and Response

In another, closely related, approach, it is also possible to design a request/response procedure between RNC and Node B regarding the initiation of the CPC recovery procedure, by using the CAPACITY REQUEST and CAPACITY ALLOCATION IUB control frames. Once again, there are spare bits that can be used for this purpose.

As above, the RNC includes an indicator in an Iub HS-DSCH CAPACITY REQUEST control frame to initiate the CPC recovery procedure. In addition, the serving Node B can respond with an Iub CAPACITY ALLOCATION control frame, using one of the spare bits, such as spare bit 6, to indicate to RNC that it has initiated the CPC recovery procedure.

Figure 5:
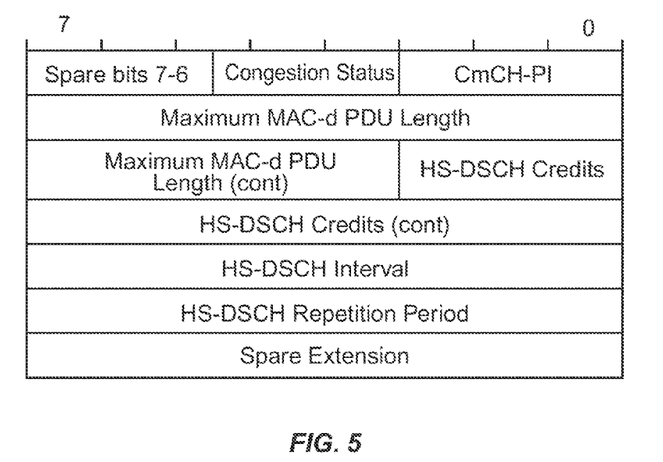
Figure 6:
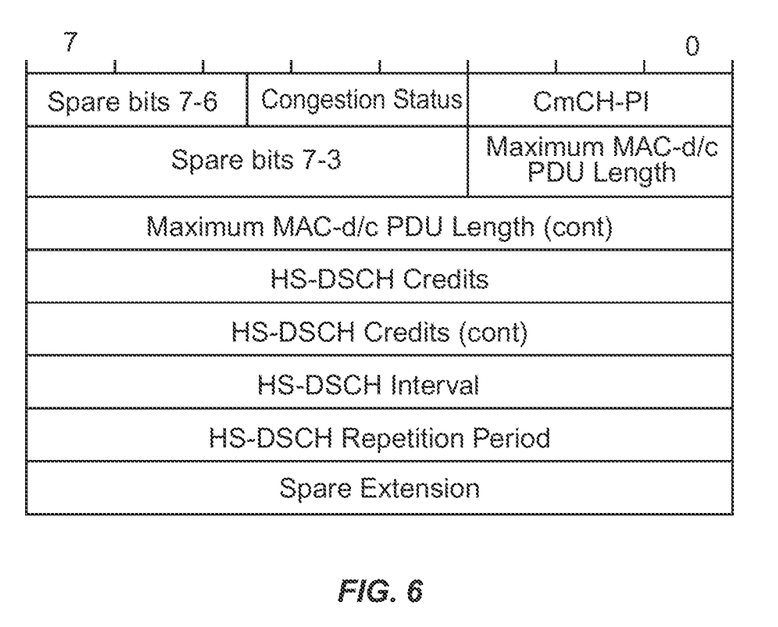

The existing frame information, as documented in chapter 6.3.3.11 of 3GPP TS 25.435, v. 10.2.0, is shown in FIGS. 5 and 6. Two types of HS-DSCH CAPACITY ALLOCATION control frames exist for the HS-DSCH capacity allocation, i.e., HS-DSCH CAPACITY ALLOCATION TYPE 1 Control Frame and HS-DSCH CAPACITY ALLOCATION TYPE 2 Control Frame. These are illustrated in FIGS. 5 and 6, respectively. Either one may be used for the purposes described in this section, since each include spare bits.

Figure 7:
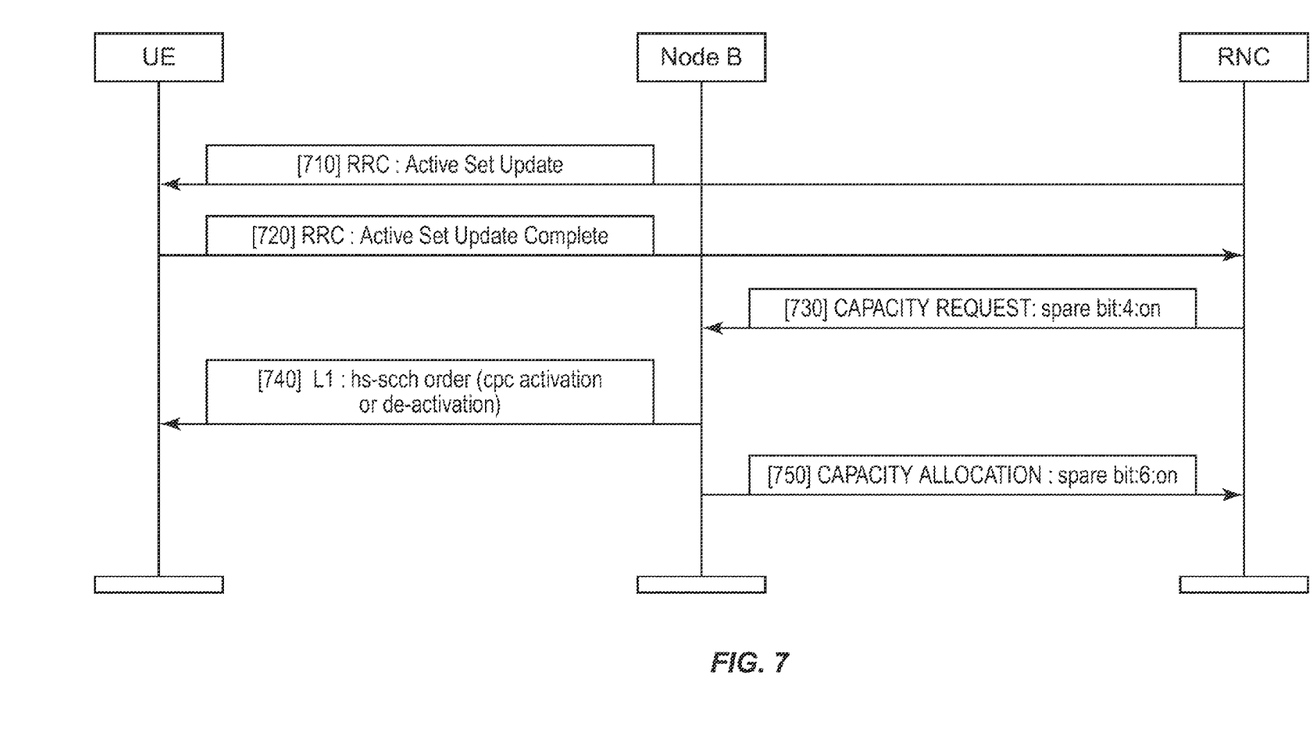
FIG. 7 is another signal flow diagram illustrating a message flow according to some embodiments of the present invention.

FIG. 7 illustrates an example procedure for handling the CPC mismatch during soft handover, using this approach. This procedure is detailed below:

1. The RNC sends the RRC Active set update message to complete the soft handover procedure. (Message 710 in FIG. 7.)

2. The UE sends the RRC Active set update complete message in response. (Message 720.)
3. The RNC, based on the following information, decides whether to include the 'CPC recovery' indicator(e.g., spare bit 4) in the Iub CAPACITY REQUEST control frame towards the Serving Node B:
   a. CPC is configured in the active set
   b. UE's release version is 7 or 8.
   c. New DTX-DRX timing information is given to UE in the RRC Active Set Update message.
   If these conditions are met, an IuB CAPACITY REQUEST control frame is sent. (Message 730.)
4. The serving Node B sends an HS-SCCH order to activate or de-activate the CPC (CPC recovery) to the UE. The HS-SCCH order is based on the last known CPC activation status. (Message 740.)
5. The serving Node B sends the Iub CAPACITY ALLOCATION control frame with 'CPC recovery activated' indicator (e.g., spare bit 6) to RNC to indicate that CPC recovery mechanism is initiated. (Message 750.)

It should be understood that step 3 detailed above can also be executed before step 2, i.e., the RNC can start sending the IUB CAPACITY REQUEST control frame with 'CPC recovery' indicator "ON" before the RRC ASU message is received from UE. Also, although not shown in FIG. 7, the RNC may continue to send Iub CAPACITY REQUEST control frames that include the 'CPC recovery' bit indicator until it gets an acknowledgement from the serving Node B. This acknowledgement may take the form of a CAPACITY ALLOCATION control frame that includes a 'cpc recovery activated' bit indicator, for example.

Solution 4: Serving Node B Detection

In still another approach, the serving Node B autonomously and continuously tries to evaluate whether a configured UE has CPC activated when the Node B is assuming that the CPC status for the UE is deactivated. With respect to DRX the Node B can do this by computing the HS-SCCH reception pattern that describes the HS-SCCH TTIs that a UE in DRX would be monitoring. (See subclause 6C.3 in 3GPP TS 25.214, Physical Layer Procedures, available at www.3gpp.org.) Since the UE will reply with a HARQ-ACK transmission on HS-DPCCH if it detects a HS-SCCH, the Node B could determine whether CPC is activated for the UE by monitoring whether a UE is transmitting on the HS-DPCCH in uplink sub-frames that corresponds to downlink TTIs that it would not be monitored if CPC was activated. To give a further example, the Node B could probe whether a UE is in CPC by transmitting HS-SCCH in a frame that does not correspond to the HS-SCCH reception pattern. Since the UE always sends an ACK/NACK for detected HS-SCCHs, a Node B that receives an ACK or NACK on the HS-SCCH transmissions could conclude that the UE does not have CPC activated. The transmission of the probing signal could either be repeated periodically or it could be triggered by some internal Node B event. Two examples of such events would be that The overall BLER on HS-PDSCH exceeds the BLER target used by the network; and The BLER for packets transmitted in TTIs that does not belong to the HS-SCCH reception pattern exceeds the BLER of the packets transmitted in the TTIs belonging to the HS-SCCH reception pattern.

These events could be coupled with timers as well as hysteresis.

As a complement, the Node B could also evaluate UE uplink transmissions to determine the CPC activation status of the UE. This would be especially useful if there was little or no data to schedule to the UE. Since a UE configured with DTX (CPC) that does not have any data to transmit only transmits its DPCCH according to the burst pattern, i.e., only in a subset of the available subframes, and since the DPCCH burst pattern is known to the Node B, the Node B could measure the received signal energy on DPCCH in subframes (slots) where the DPCCH is known to be present, and separately measure signal energy in subframes (slots) where the DPCCH would not be present according to the DPCCH burst pattern if CPC was activated for the UE). By comparing the received energy levels (e.g., taking the average) of these measurements, the Node B could estimate the likelihood that the UE has CPC activated. One comparison would be to take the difference of the average received slot energy for the two types (as described above). If the difference in received energy exceeds a threshold (possibly for a pre-determined duration of time) the Node B could use this for classifying that the UE has CPC activated.

With any of the above approaches, the problem described earlier can be solved with very minor impacts to the standard. One advantage of the first solution described above is that a large percentage of the CPC mismatch cases occur in scenarios where there is no soft handover involved. In these scenarios, the mismatch problem can be simply solved via Iub/Iur control plane, e.g., with the modification of the existing NBAP and RNSAP messages. Advantages of the second solution include that Layer 2 in the RNC can trigger the CPC recovery mechanism, with no need for Layer 3 intervention. Further, there is no need for repeating the user plane frames, and overall the solution is simplified. An advantage with the third solution is that with the acknowledgement from Node B, the system can be assured that the communication between SRNC and Node B will work. Finally, an advantage of the fourth solution is that only the Node B is impacted.

As seen above, embodiments of the various techniques described above include methods implemented in an RNC or a Node B, or both. These methods include the various signaling techniques described above, which include, in several instances, the modification of previously known signaling messages and/or user plane frame headers to include new indicators/parameters. These new indicators/parameters are used to signal, for example, that a given UE should be expected to have non-uniform behavior with respect to remembering CPC activation status after acting on a RRC Reconfiguration message, because it is a Release 7 or Release 8 mobile station. These new indicators/parameters may also be used by a Node B, in some embodiments, to acknowledge the receipt of an indication from an RNC that non-uniform behavior should be anticipated for a given UE.

Figure 8:
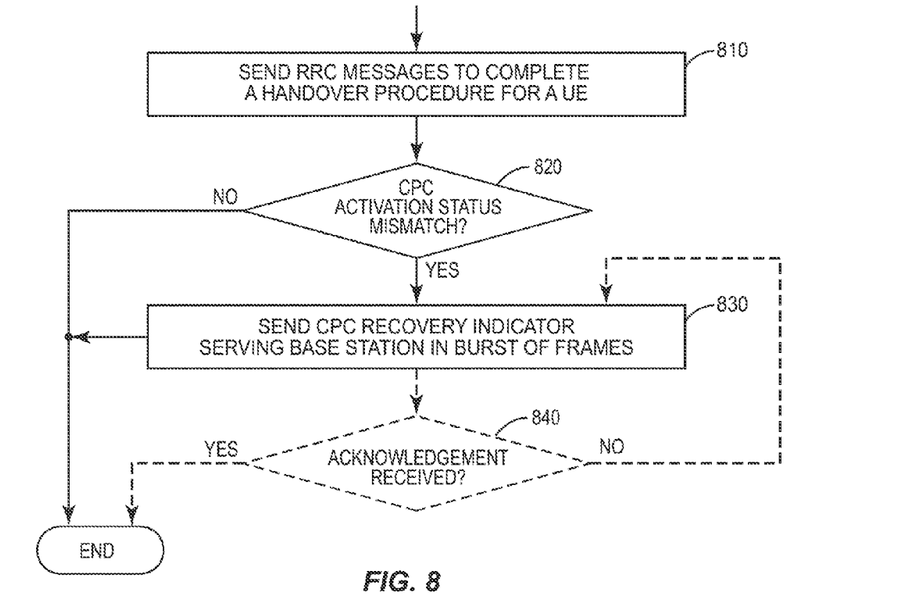
FIG. 8 is a process flow diagram illustrating an example method according to several embodiments of the invention.

One example method, implemented by a network node such as an RNC, is illustrated in FIG. 8. The illustrated method takes place in the context of a soft handover procedure and thus begins, as shown at block 810, with the sending of various RRC messages to complete a handover procedure for a UE. It should be appreciated that the technique for controlling CPC operation illustrated in FIG. 8 can be applied more generally, including to non-soft-handover scenarios. For this reason, block 810 is rendered with a dashed outline, indicating that it does not necessarily apply in every context.

As shown at block 820, the method continues with a determination of whether there is a potential CPC activation status mismatch between a user equipment, UE, and its serving base station, i.e., whether the UE can be expected to exhibit non-uniform behavior with respect to continuation of Continuous Packet Connectivity (CPC). If so, then a CPC recovery procedure is needed for the UE, and at least one CPC Recovery indicator is sent to the serving Node B, as shown at block 830.

In some embodiments, the RNC sends a pre-determined number of instances of the CPC Recovery indicator. In others, the RNC repeatedly sends the CPC Recovery indicator until it receives an acknowledgement indicator from the Node B indicating that it has received the CPC Recovery indicator and/or has initiated a CPC recovery process. This is shown at block 840

In some embodiments, the above steps are carried out upon completing a soft handover procedure for a UE. In some instances, the CPC Recovery indicator is sent in user plane frames. In others, the CPC Recovery indicator is sent in a HS-DSCH CAPACITY REQUEST control frame, e.g., using a previously spare bit. In some embodiments, an acknowledgement response is received from the Node B via a CAPACITY ALLOCATION Iub control frame.

Figure 9:
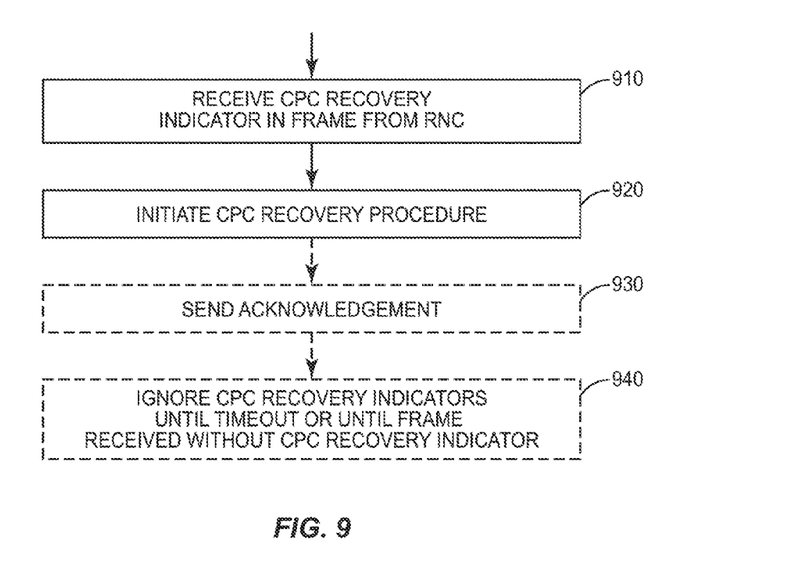
FIG. 9 is another process flow diagram illustrating complementary methods, according to another aspect of the invention.

Other example methods include complementary methods implemented by a base station, i.e., a Node B in 3GPP terminology. One such method is illustrated in FIG. 9, and comprises receiving a CPC Recovery Indicator, corresponding to a UE served by the base station, from an RNC. This is shown at block 910. In response to the CPC Recovery Indicator, a CPC recovery mechanism is initiated, as shown at block 920. This mechanism may comprise, for example, transmitting a target cell HS-SCCH order for activating or deactivating CPC to the UE. In some embodiments, the base station sends a pre-determined number of instances of the order, while in others the base station repeatedly sends the order until it receives an indicator from the UE indicating that it has received the order. In some embodiments, the base station sends an acknowledgement of the CPC Recovery indicator to the RNC it was received from, as shown at block 930. The base station can then ignore subsequent CPC recovery indicators from the RNC, e.g., until a pre-determined time has expired, or until after one or more frames without the CPC recovery indicator are received from the RNC. This is shown at block 940 in FIG. 9.

Still other example methods include other methods implemented by a base station such as a Node B. One such method comprises determining the CPC activation status for a UE. In some embodiments, this is done by computing the HS-SCCH reception pattern for DRX that corresponds to the UE, and observing whether the UE acknowledges transmissions on HS-SCCH that correspond to the pattern.

Figure 10:
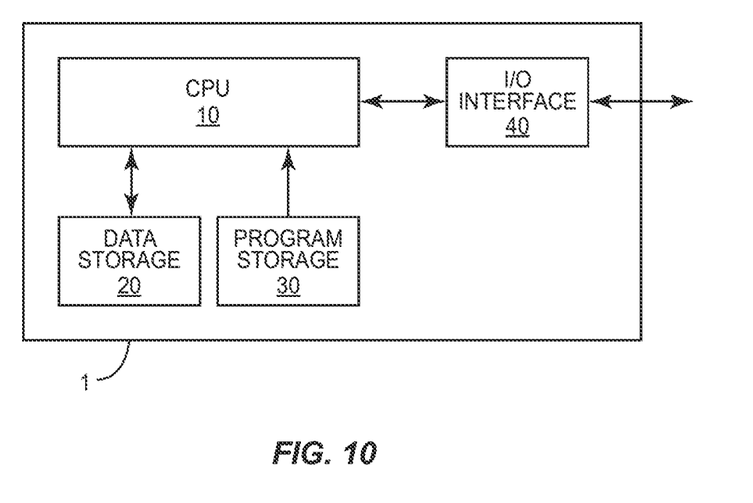
FIG. 10 is a block diagram illustrating components of an example network node, adapted to carry out one or more of the techniques described herein.

Those skilled in the art will appreciate that the methods described may be used in combination with each other. Further, each of the techniques and the methods described above can be implemented in one or more of several network nodes, such as a Radio Network Controller (RNC) or a Node B, as appropriate for any given technique. FIG. 10 is a schematic illustration of a node 1 in which a method embodying any of the presently described techniques can be implemented. A computer program for controlling the node 1 to carry out a method embodying the present invention is stored in a program storage 30, which comprises one or several memory devices. Data used during the performance of a method embodying the present invention is stored in a data storage 20, which also comprises one or more memory devices. During performance of a method embodying the present invention, program steps are fetched from the program storage 30 and executed by a Central Processing Unit (CPU) 10, retrieving data as required from the data storage 20. Output information resulting from performance of a method embodying the present invention can be stored back in the data storage 20, or sent to an Input/Output (I/O) interface 40, which may comprise a transmitter for transmitting data to other nodes, as required. Likewise, the Input/Output (I/O) interface 40 may comprise a receiver for receiving data from other nodes, for example for use by the CPU 10.

It will be appreciated by the person of skill in the art that various modifications may be made to the above described embodiments without departing from the scope of the present invention. For example, it will be readily appreciated that although the above embodiments are described with reference to parts of a 3GPP network, an embodiment of the present invention will also be applicable to like networks, such as a successor of the 3GPP network, having like functional components. Therefore, in particular, the terms 3GPP and associated or related terms used in the above description and in the enclosed drawings and any appended claims now or in the future are to be interpreted accordingly.

Examples of several embodiments of the present invention have been described in detail above, with reference to the attached illustrations of specific embodiments. Because it is not possible, of course, to describe every conceivable combination of components or techniques, those skilled in the art will appreciate that the present invention can be implemented in other ways than those specifically set forth herein, without departing from essential characteristics of the invention. Modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation. The present embodiments are thus to be considered in all respects as illustrative and not restrictive.

What is claimed is:

1. A method, in a Radio Network Controller of a wireless communication system, for controlling Continuous Packet Connectivity (CPC) operation, the method comprising:
   determining that there is a potential CPC activation status mismatch between a user equipment (UE) and its serving base station; and,
   in response to determining that there is a potential CPC activation status mismatch, sending a CPC recovery indicator in a frame header of at least one user plane frame sent to the serving base station for the UE.

2. The method of claim 1, wherein determining that there is a potential CPC activation status mismatch comprises determining that the UE has a non-uniform behavior towards remembering a CPC activation status.

3. The method of claim 1, wherein determining that there is a potential CPC activation status mismatch comprises deciding that a CPC recovery procedure is needed when all of the following are applicable:
   CPC is configured in the active set for the UE;
   a release version of the UE is 3GPP Release 7 or 3GPP Release 8; and
   new Discontinuous Transmit timing or Discontinuous Receive timing, or both, has been given to the UE in a handover procedure.

4. The method of claim 1, wherein the CPC recovery indicator is sent in connection with a soft-handover procedure.

5. The method of claim 1, wherein the CPC recovery indicator is sent in a frame header of each of a predetermined number of consecutive user plane frames sent to the serving base station for the UE.

6. The method of claim 1, further comprising continuing to send CPC recovery indicators in frame headers of user plane frames sent to the serving base station until a CPC recovery acknowledgement indicator is received from the serving base station.

7. A method, in a base station of a wireless communication system, for controlling Continuous Packet Connectivity (CPC) operation, the method comprising:
receiving a CPC recovery indicator for a user equipment (UE) in a frame header of at least one user plane frame for the UE sent from a Radio Network Controller; and
initiating a CPC recovery procedure in response to receiving the CPC recovery indicator.

8. The method of claim 7, wherein initiating the CPC recovery procedure comprises sending an HS-SCCH order to the UE to activate or de-activate CPC.

9. The method of claim 8, wherein the HS-SCCH order is determined according to a last known CPC activation status for the UE.

10. The method of claim 7, wherein the CPC recovery indicator is received in a frame header of each of a plurality of consecutive user plane frames for the UE.

11. The method of claim 7, wherein the CPC recovery procedure is initiated in response to a first one of two or more received CPC recovery indicators, the method further comprising ignoring subsequent CPC recovery indicators for a configured period of time after the CPC procedure is initiated.

12. The method of claim 7, wherein the CPC recovery procedure is initiated in response to a first one of two or more received CPC recovery indicators, the method further comprising ignoring subsequent CPC recovery indicators until the base station receives a user plane frame for the UE that does not include a CPC recovery indicator.

13. The method of claim 7, further comprising sending a CPC recovery acknowledgement indicator to the Radio Network Controller.

14. A radio network controller (RNC) for use in a wireless communication system and adapted to control Continuous Packet Connectivity (CPC) operation, the RNC comprising:
a processing unit adapted to determine that there is a potential CPC activation status mismatch between a user equipment (UE) and its serving base station; and,
an interface unit;
wherein the processing unit is further adapted to send a CPC recovery indicator in a frame header of at least one user plane frame sent to the serving base station for the UE, via the interface unit, in response to determining that there is a potential CPC activation status mismatch.

15. The RNC of claim 14, wherein the processing unit is adapted to determine that there is a potential CPC activation status mismatch between a UE and its serving base station by deciding that a CPC recovery procedure is needed when all of the following are applicable:
CPC is configured in an active set for the UE;
a release version of the UE is 3GPP Release 7 or 3GPP Release 8; and
new Discontinuous Transmit timing or Discontinuous Receive timing, or both, has been given to the UE in a handover procedure.

16. The RNC of claim 14, wherein the processing unit is further adapted to continue sending the CPC recovery indicator in frame headers of user plane frames sent to the serving base station until a CPC recovery acknowledgement indicator is received from the serving base station.

17. The RNC of claim 14, wherein the processing unit is adapted to send the CPC recovery indicator in frame headers of one or more High-Speed Downlink Shared Channel, HS-DSCH frames via the interface unit.

18. A base station for use in a wireless communication system and adapted to control Continuous Packet Connectivity (CPC) operation, the base station comprising:
an interface unit; and
a processing unit adapted to receive, via the interface unit, a CPC recovery indicator for a user equipment (UE) in a frame header of at least one user plane frame for the UE sent from a Radio Network Controller, and to initiate a CPC recovery procedure in response to receiving the CPC recovery indicator.

19. The base station of claim 18, wherein the processing unit is adapted to initiate the CPC recovery procedure by sending an HS-SCCH order to the UE to activate or de-activate CPC.

20. The base station of claim 19, wherein the HS-SCCH order is determined according to a last known CPC activation status for the UE.

21. The base station of claim 18, wherein the processing unit is further adapted to send a CPC recovery acknowledgement indicator to the Radio Network Controller, via the interface unit.

* * * * *

UNITED STATES PATENT AND TRADEMARK OFFICE
CERTIFICATE OF CORRECTION

PATENT NO. : 8,995,283 B2  
APPLICATION NO. : 13/578776  
DATED : March 31, 2015  
INVENTOR(S) : Shi et al.

Page 1 of 1

It is certified that error appears in the above-identified patent and that said Letters Patent is hereby corrected as shown below:

On the Title Page, in Item (73), under "Assignee", in Column 1, Line 1,
delete "Telefonaktieboalget" and insert -- Telefonaktiebolaget --, therefor.

On the Title Page, in Item (74), under "Attorney, Agent, or Firm", in Column 2,
Line 1, delete "Muprhy," and insert -- Murphy, --, therefor.

IN THE CLAIMS

In Column 5, Line 55, delete ""DTX_DRX" and insert -- "DTX-DRX --, therefor.

In Column 6, Line 44, delete "set" and insert -- set. --, therefor.

In Column 7, Line 37, delete "a Iub" and insert -- an Iub --, therefor.

In Column 9, Line 7, delete "set" and insert -- set. --, therefor.

In Column 10, Line 10, delete "UE)." and insert -- UE. --, therefor.

Signed and Sealed this
Sixth Day of October, 2015

Michelle K. Lee
*Director of the United States Patent and Trademark Office*